(12) United States Patent
Fuse (10) Patent No.: US 9,767,123 B2
(45) Date of Patent: Sep. 19, 2017

(54) NON-TRANSITORY COMPUTER READABLE MEDIUM, INFORMATION PROCESSING APPARATUS, AND INFORMATION PROCESSING METHOD FOR DETERMINING A LOCATION OF A TARGET BASED ON IMAGE INFORMATION GENERATED BY CAPTURING AN IMAGE OF THE TARGET

(71) Applicant: FUJI XEROX CO., LTD., Tokyo (JP)

(72) Inventor: Toru Fuse, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 63 days.

(21) Appl. No.: 14/695,572

(22) Filed: Apr. 24, 2015

(65) Prior Publication Data

US 2016/0162515 A1    Jun. 9, 2016

(30) Foreign Application Priority Data

Dec. 8, 2014    (JP) .................................. 2014-247772

(51) Int. Cl.
*G06F 17/30*    (2006.01)

(52) U.S. Cl.
CPC .. *G06F 17/30268* (2013.01); *G06F 17/30247* (2013.01); *G06F 17/30277* (2013.01)

(58) Field of Classification Search
CPC ......... G06F 17/30268; G06F 17/30247; G06F 17/30277
See application file for complete search history.

(56) References Cited

U.S. PATENT DOCUMENTS

| 7,382,405 B2 * | 6/2008 | Kusaka | H04N 1/00281 348/207.11 |
| 2013/0036438 A1 * | 2/2013 | Kutaragi | H04N 21/2743 725/38 |
| 2013/0272569 A1 | 10/2013 | Yumbe et al. | |
| 2015/0281568 A1 * | 10/2015 | Kamada | H04N 5/91 348/207.1 |

FOREIGN PATENT DOCUMENTS

| JP | 2013-167973 A | 8/2013 |
| JP | 2013-222335 A | 10/2013 |

* cited by examiner

*Primary Examiner* — Tuan Ho
(74) *Attorney, Agent, or Firm* — Oliff PLC (57) ABSTRACT

A non-transitory computer readable medium stores a program causing a computer to execute a managing process. The managing process includes determining a location of a photo-shooting target based on photo-shooting information of image information, the image information being generated by capturing the photo-shooting target, and associating at least one shop with the captured image, with reference to location information of plural shops that has been registered in advance.

11 Claims, 9 Drawing Sheets

| PRODUCT ID | SHOP ID | IMAGE ID | PHOTOGRAPHER ID | PHOTO-SHOOTING LOCATION | META TAG INFORMATION |
|---|---|---|---|---|---|
| 001 | 001 | 00017 | 005 | (xxx, yyy) | PRODUCT NAME: LEATHER BAG PRICE: ¥20,000 |
| | | 00104 | 007 | (xxy, yyy) | ... |
| | | 00030 | 013 | (xxz, yyx) | ... |
| 003 | 001 | 01011 | 072 | (xxx, yyy) | ... |
| | | 02315 | 075 | (xxy, yyy) | |
| ... | ... | ... | ... | ... | |

| SHOP ID | SHOP LOCATION | E-MAIL ADDRESS | URL | TELEPHONE NUMBER |
|---|---|---|---|---|
| 001 | (35°39'30", 139°44'55.9") | abc@xxx.co.jp | abc.co.jp | 03-1234-5678 |
| 002 | (35°42'36", 139°48'38") | bca@yyy.com | yyy.com | 03-9012-3456 |
| 003 | (34°59'15", 135°45'33") | cab@zzz.jp | zzz.jp | 075-123-4567 |
| ... | ... | ... | ... | ... |

| USER ID | IMAGE ID | PRODUCT ID | PRODUCT NAME | PRICE | SHOP NAME | STOCK | RATING |
|---|---|---|---|---|---|---|---|
| 005 | 00017 | 001 | LEATHER BAG | ¥20,000 | LA-LI-LU LEATHER | IN STOCK | 3 |
| 005 | 00018 | 007 | LEATHER SHOES | ¥50,000 | SHOE STORE | IN STOCK | 2.5 |
| 005 | 00019 | 085 | HAT | ¥30,000 | TOKYO BO-SHI | OUT OF STOCK (DELIVERY TIME ABOUT 3 MONTHS) | 4 |
| ... | ... | ... | ... | ... | ... | ... | ... |

NON-TRANSITORY COMPUTER READABLE MEDIUM, INFORMATION PROCESSING APPARATUS, AND INFORMATION PROCESSING METHOD FOR DETERMINING A LOCATION OF A TARGET BASED ON IMAGE INFORMATION GENERATED BY CAPTURING AN IMAGE OF THE TARGET

CROSS-REFERENCE TO RELATED APPLICATIONS

This application is based on and claims priority under 35 USC 119 from Japanese Patent Application No. 2014-247772 filed Dec. 8, 2014.

BACKGROUND

Technical Field

The present invention relates to a non-transitory computer readable medium, an information processing apparatus, and an information processing method.

SUMMARY

According to an aspect of the invention, there is provided a non-transitory computer readable medium storing a program causing a computer to execute a managing process. The managing process includes determining a location of a photo-shooting target based on photo-shooting information of image information, the image information being generated by capturing the photo-shooting target, and associating at least one shop with the captured image, with reference to location information of plural shops that has been registered in advance.

BRIEF DESCRIPTION OF THE DRAWINGS

Exemplary embodiments of the present invention will be described in detail based on the following figures, wherein.

DETAILED DESCRIPTION

Exemplary Embodiment (Configuration of Information Processing System)

Figure 1:
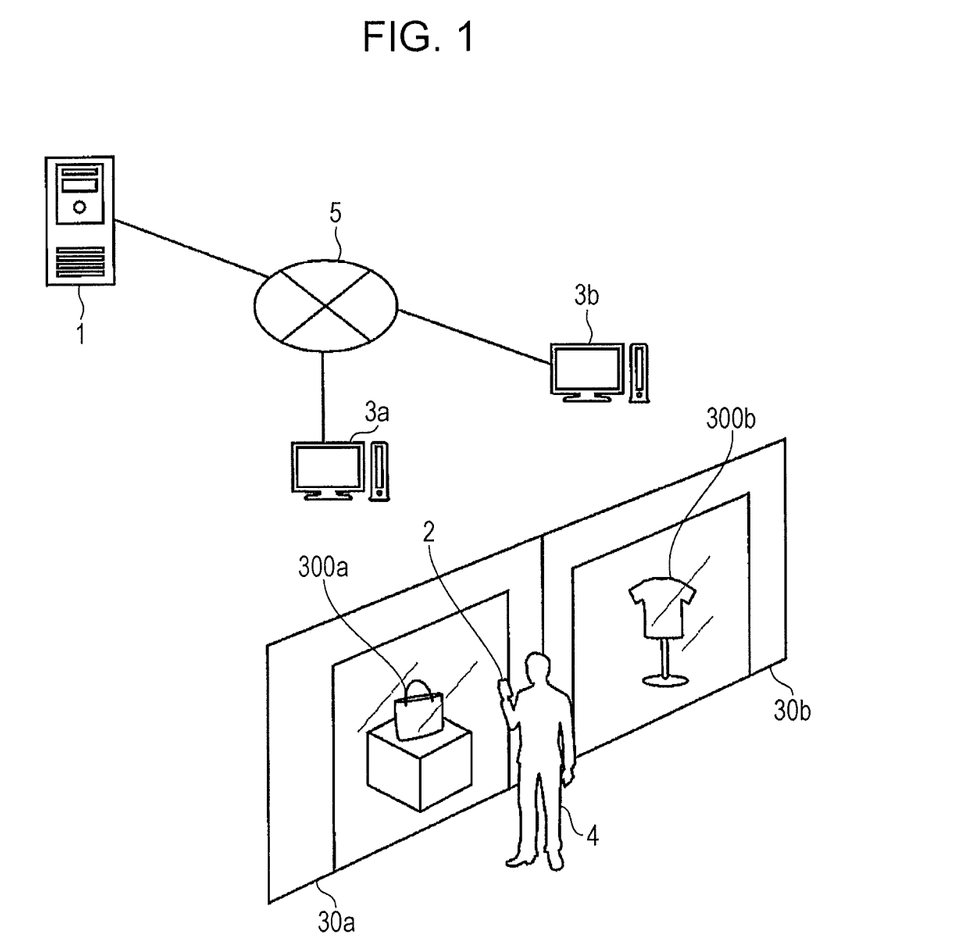
FIG. 1 is a schematic diagram illustrating an example of the configuration of an information processing system according to an exemplary embodiment.

FIG. 1 is a schematic diagram illustrating an example of the configuration of an information processing system according to an exemplary embodiment.

This information processing system is constituted by connecting an information processing server 1, a portable terminal 2, and terminals 3a and 3b through a network 5 such that communication is possible. The portable terminal 2 is operated by a user 4. The terminals 3a and 3b are installed in shops 30a and 30b, respectively, and are operated by shop clerks of the respective shops 30a and 30b.

With the above-described configuration, when there is a product that has captured the interest of the user 4 among products 300a and 300b in or near the shop 30a or 30b, the user 4 treats this product as a photo-shooting target and captures an image of this product using the portable terminal 2. The image information of the captured image of the product is transmitted together with photo-shooting information via the network 5 to the information processing server 1. The information processing server 1 determines a shop where the product the image of which is represented by the image information is handled, transmits the image information to a terminal, a destination, installed in the shop, requests confirmation of information on the product, and acquires a confirmation. The information processing server 1 associates the acquired information on the product with the image information and transmits the resulting information in a catalog format to the portable terminal 2. The user 4 views a catalog using the portable terminal 2 and performs a purchase process if there is a product that captures the interest of the user 4.

The information processing server 1 is a server-type information processing apparatus and operates in accordance with a request issued by the portable terminal 2. The information processing server 1 includes electronic components in the main body, such as a central processing unit (CPU), a flash memory, and the like, the CPU having a function with which information is processed.

The portable terminal 2 is a portable phone, a tablet, or the like and includes, in the main body, a camera for capturing an image of a product, a Global Positioning System (GPS) for acquiring location information, an acceleration sensor that detects the posture of the portable terminal 2 at the time of photo shooting, an electronic compass that detects a photo-shooting direction, and the like in addition to a CPU and a flash memory, the CPU having a function with which information is processed. Note that the GPS, the acceleration sensor, the electronic compass, and the like may be included in a digital camera or the like that is separate from the portable terminal 2 and the portable terminal 2 may receive information through communication from the digital camera or the like.

The terminals 3a and 3b are information processing apparatuses such as personal computers (PCs) and include electronic components in the main body, such as a central processing unit (CPU), a flash memory, and the like, the CPU having a function with which information is processed.

The network 5 is a communication network, and examples of the network 5 include a wired communication network and a wireless communication network such as the Internet, a local-area network (LAN), and the like.

Note that one information processing server 1 is illustrated in FIG. 1; however, plural information processing servers 1 may be prepared and distributed processing may be performed on a job. In addition, one portable terminal 2 is illustrated in FIG. 1; however, plural portable terminals 2 may be prepared in accordance with the number of users. In addition, the terminals 3a and 3b are prepared at respective shops, and the number of terminals may be reduced or increased in accordance with the number of shops or plural terminals may also be prepared at one shop.

(Configuration of Information Processing Apparatus)

Figure 2:
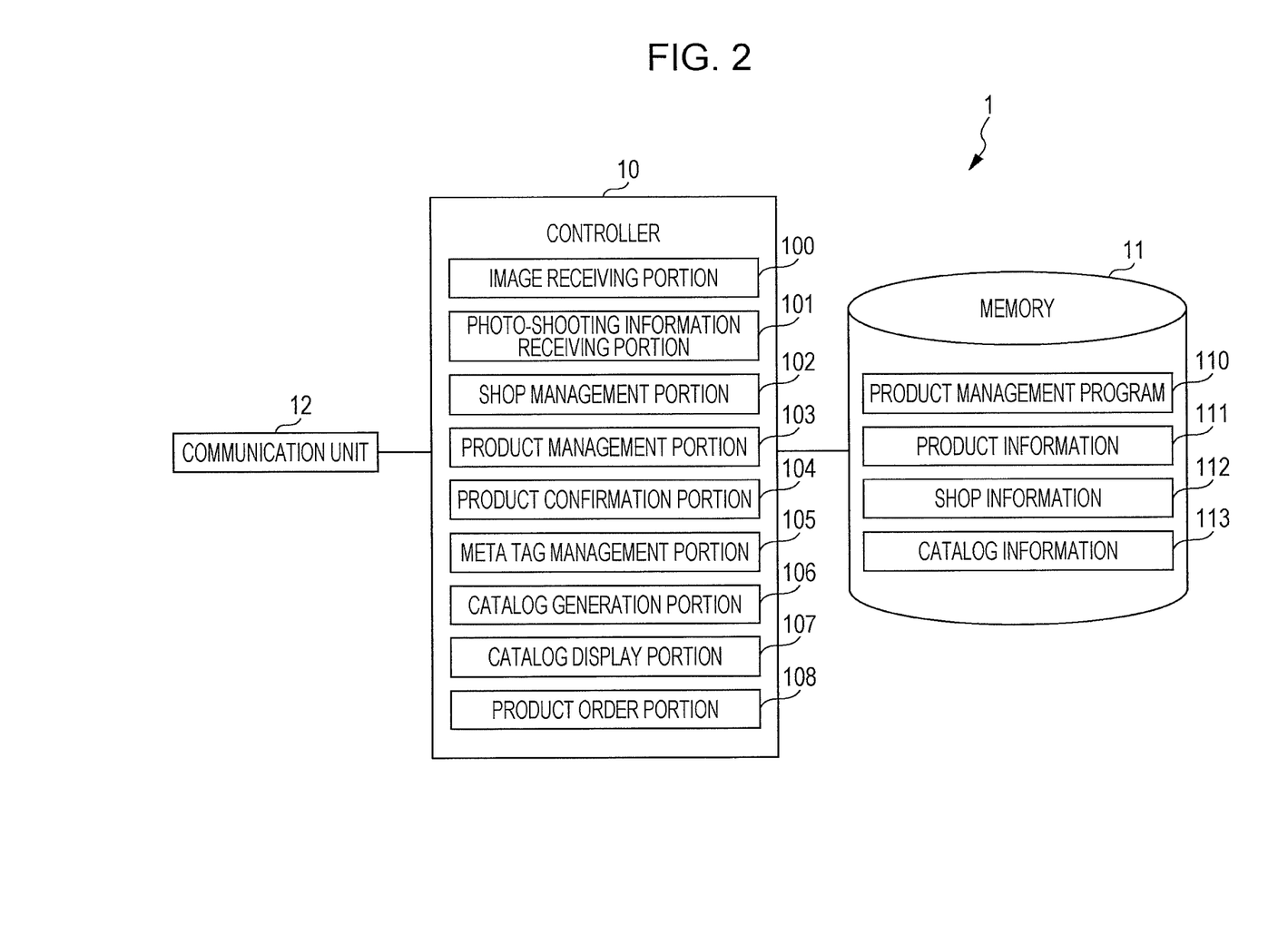
FIG. 2 is a block diagram illustrating an example of the configuration of an information processing server according to the exemplary embodiment.

FIG. 2 is a block diagram illustrating an example of the configuration of the information processing server 1 according to the exemplary embodiment.

The information processing server 1 includes a controller 10, a memory 11, and a communication unit 12. The controller 10 is constituted by a CPU and the like, controls various units, and executes various programs. The memory 11 is constituted by a storage medium such as a flash memory or the like and stores information. The communication unit 12 communicates with the outside through the network 5.

By executing a product management program 110, which will be described later, the controller 10 functions as an image receiving portion 100, a photo-shooting information receiving portion 101, a shop management portion 102, a product management portion 103, a product confirmation portion 104, a meta tag management portion 105, a catalog generation portion 106, a catalog display portion 107, a product order portion 108, and the like.

The image receiving portion 100 receives image information of an image captured by the portable terminal 2 and transmitted from the portable terminal 2.

The photo-shooting information receiving portion 101 receives photo-shooting information, which is transmitted together with image information from the portable terminal 2. Here, the photo-shooting information is information such as location information, a photo-shooting direction, a focal length, and the like, the location information indicating the location of the portable terminal 2 at the time of capturing of an image the image information of which is received by the image receiving portion 100. The location information, the photo-shooting direction, and the focal length are pieces of information obtained from the GPS, the acceleration sensor, and the camera of the portable terminal 2, respectively.

The shop management portion 102 determines the location of a product in accordance with photo-shooting information received by the photo-shooting information receiving portion 101 and determines a shop that handles a product included in at least one image represented by image information from plural pieces of information registered in shop information 112. Note that the shop information 112 is information in which location information is associated with information on shops.

The product management portion 103 performs registration in product information 111 such that information on a product included in image information is associated with the image information. At the time when the image receiving portion 100 receives image information, since information on a product is unknown, registration is performed such that the information on the product is left blank. At a time when the information on the product is acquired by the product confirmation portion 104 and the meta tag management portion 105, which will be described later, the information on the product is additionally registered. Note that in the case where image information similar to the received image information has already been registered, registration may be performed in the product information 111 by treating the product and a product corresponding to the image information that has already been registered as the same products.

The product confirmation portion 104 transmits image information to a shop determined by the shop management portion 102, requests confirmation of information on a product included in the image information, receives information on the product transmitted from the shop, and performs registration in the product information 111. Specific examples of information on a product include a product name, a stock of the product, a delivery time, a price, and the like. A transmission method is no object as long as information is transmitted, examples of which include e-mail, FAX, a message function of an SNS, and the like. Note that confirmation of a product may be automated or may also be performed by supporting inquiries made by persons.

In the case where information on a product the same as a product included in an image represented by image information has been registered in advance, the meta tag management portion 105 registers, in the product information 111, the information as meta tag information.

The catalog generation portion 106 generates, on a per-user basis, catalog information 113 in which image information is associated with information on a product in accordance with the product information 111.

The catalog display portion 107 performs processing to display the catalog information 113 on the portable terminal 2. Specifically, display is performed such that image information of an image captured by the portable terminal 2 is associated with information on a product included in the image information.

The product order portion 108 performs, when an operation is performed for placing an order for a product at the portable terminal 2, a process for placing an order for the product with a shop that handles the product.

The memory 11 stores the product management program 110, the product information 111, the shop information 112, the catalog information 113, and the like, the product management program 110 serving as a photo-shooting target management program that causes the controller 10 to operate as the above-described portions 100 to 108.

(Configuration of Portable Terminal)

Figure 3:
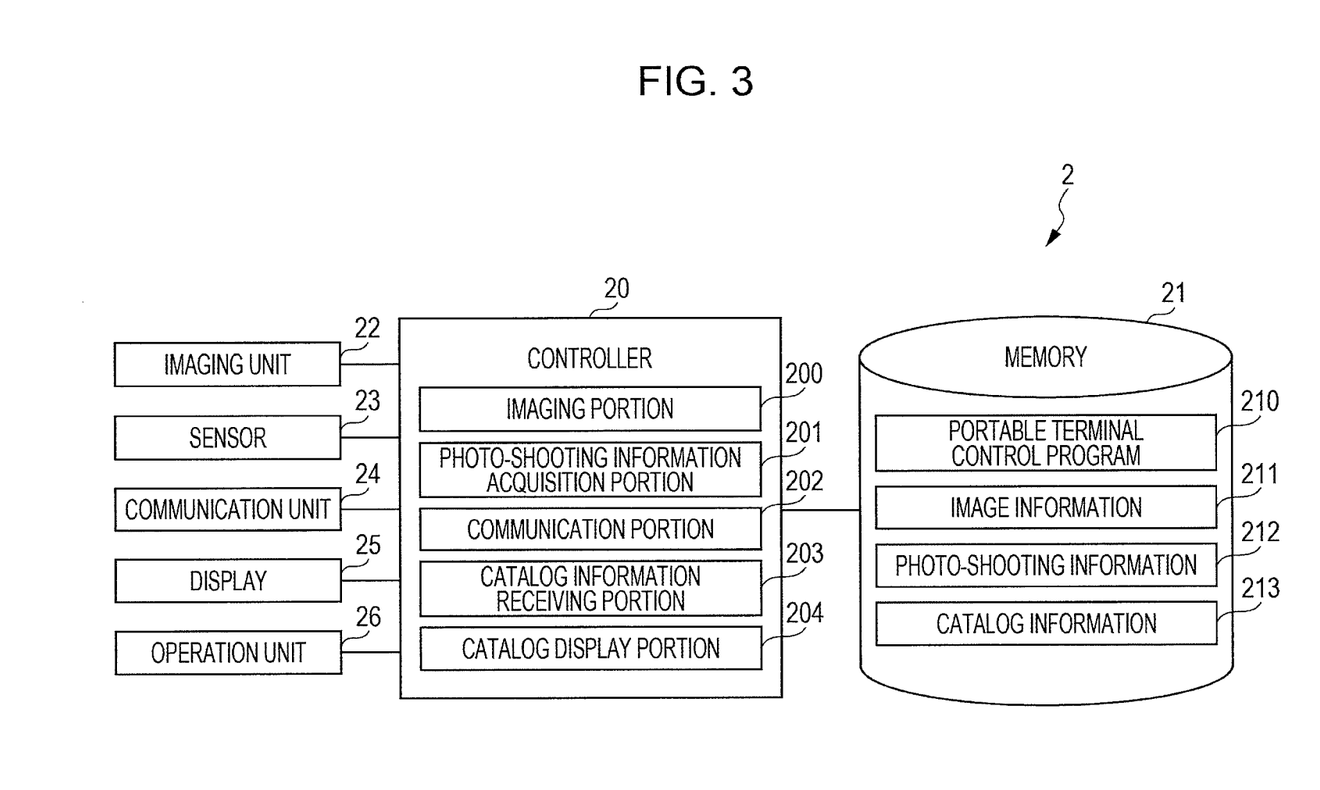
FIG. 3 is a block diagram illustrating an example of the configuration of a portable terminal according to the exemplary embodiment.

FIG. 3 is a block diagram illustrating an example of the configuration of the portable terminal 2 according to the exemplary embodiment.

The portable terminal 2 includes a controller 20, a memory 21, an imaging unit 22, a sensor 23, a communication unit 24, a display 25, and an operation unit 26. The controller 20 is constituted by a CPU and the like, controls various units, and executes various programs. The memory 21 is constituted by a storage medium such as a flash memory or the like and stores information. The imaging unit 22 generates image information by capturing an image. The sensor 23 is constituted by a GPS for acquiring location information, an acceleration sensor for detecting the posture of the portable terminal 2 at the time of photo shooting, an electronic compass for detecting a photo-shooting direction, and the like. The communication unit 24 communicates with the outside through the network 5. The display 25 is constituted by a liquid crystal display (LCD) or the like and displays characters and images. The operation unit 26 is constituted by a switch, a touch sensor, or the like.

The controller 20 functions as an imaging portion 200, a photo-shooting information acquisition portion 201, a communication portion 202, a catalog information receiving portion 203, a catalog display portion 204, and the like by executing a portable terminal control program 210, which will be described late.

The imaging portion 200 controls the imaging unit 22, causes the imaging unit 22 to capture an image of an imaging target, and stores image information 211, which is generated, in the memory 21.

The photo-shooting information acquisition portion 201 acquires photo-shooting information 212 from the sensor 23 at the time of photo shooting, and stores the photo-shooting information 212 in the memory 21. Note that the photo-shooting information 212 includes a focal length acquired from the imaging unit 22 in addition to location information acquired from the GPS, posture information acquired from the acceleration sensor, and photo-shooting direction information acquired from the electronic compass.

The communication portion 202 transmits the image information 211 and the photo-shooting information 212, which corresponds to the image information 211, via the communication unit 24 to the information processing server 1.

The catalog information receiving portion 203 receives catalog information 213 from the information processing server 1 and stores the catalog information 213 in the memory 21.

The catalog display portion 204 displays the catalog information 213 on the display 25.

The memory 21 stores the portable terminal control program 210, the image information 211, the photo-shooting information 212, the catalog information 213, and the like, the portable terminal control program 210 causing the controller 20 to operate as the above-described portions 200 to 204.

Figure 4:
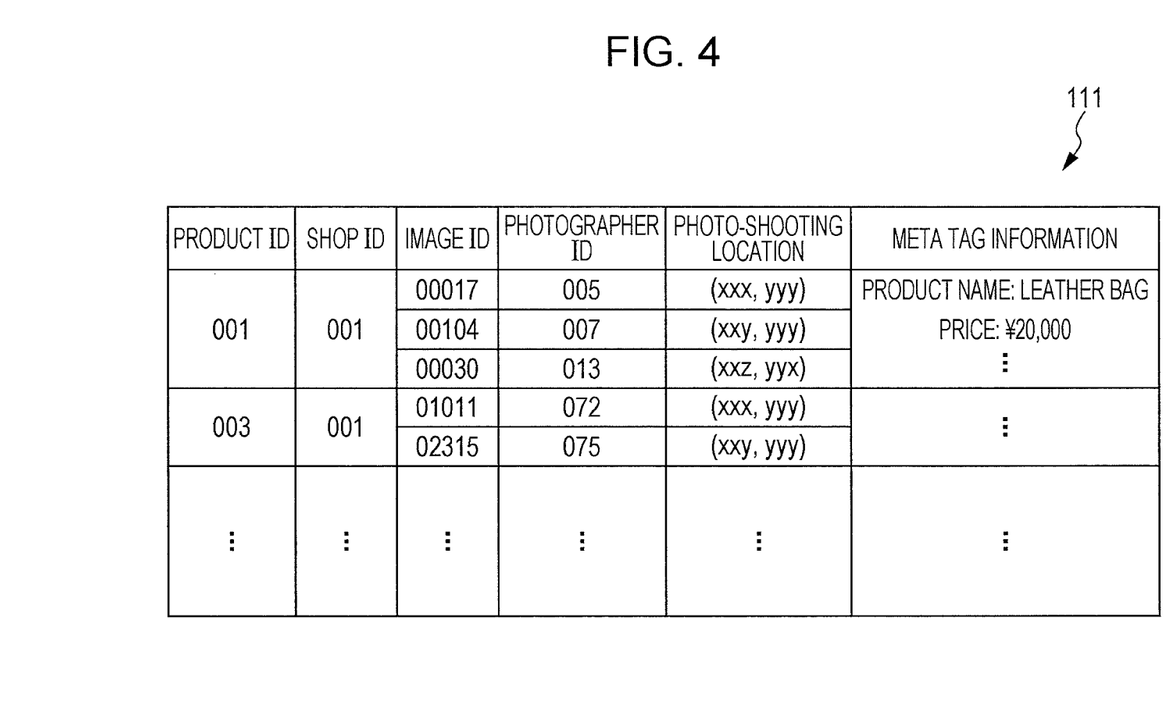
FIG. 4 is a schematic diagram illustrating an example of the configuration of product information.

FIG. 4 is a schematic diagram illustrating an example of the configuration of the product information 111.

The product information 111 includes a product ID for identifying a product, a shop ID for identifying a shop that handles the product, an image ID for identifying image information, an image represented by the image information including the product, a photographer ID for identifying a user who has captured the image represented by the image information, a photo-shooting location indicating a place where the image represented by the image information is captured, and meta tag information indicating information on the product.

Figure 5:
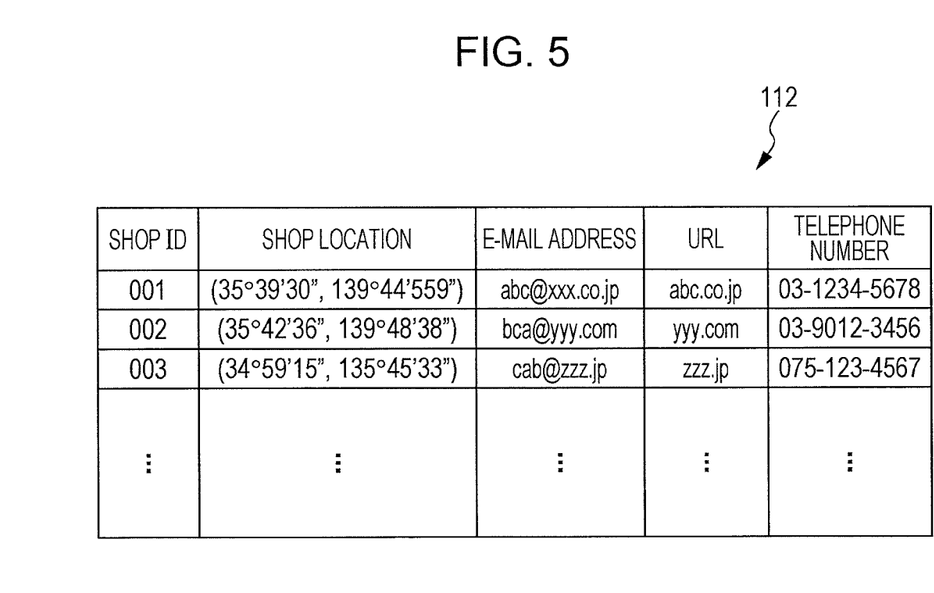
FIG. 5 is a schematic diagram illustrating an example of the configuration of shop information.

FIG. 5 is a schematic diagram illustrating an example of the configuration of the shop information 112.

The shop information 112 includes a shop ID for identifying a shop that handles a product, a shop location indicating the location of the shop, and an e-mail address, a URL, and a telephone number as examples of the shop's contact information.

Figure 6:
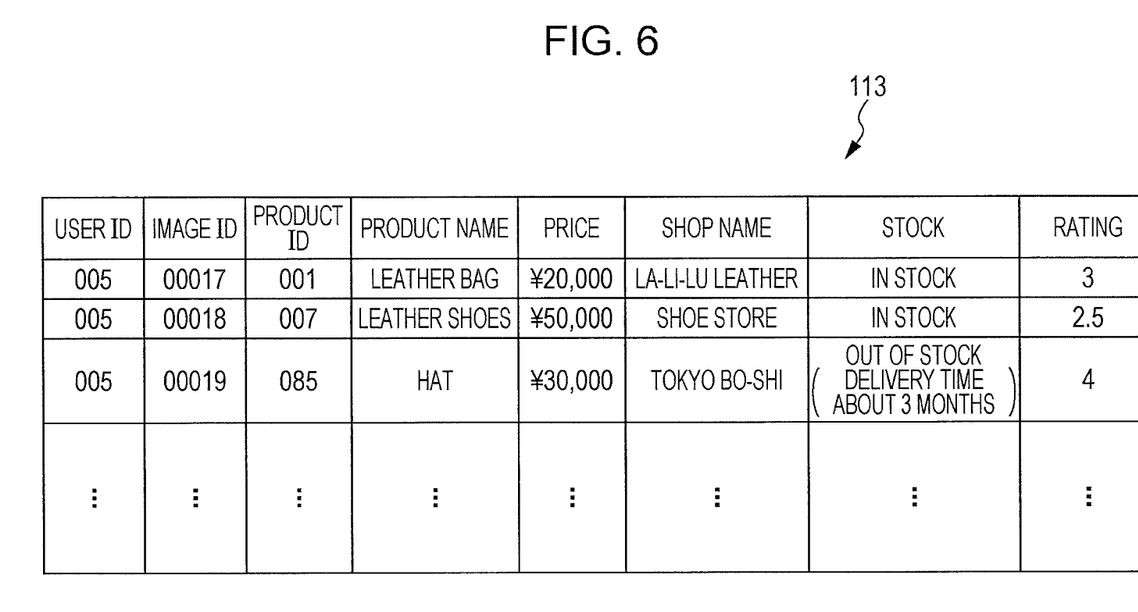
FIG. 6 is a schematic diagram illustrating an example of the configuration of catalog information.

FIG. 6 is a schematic diagram illustrating an example of the configuration of the catalog information 113.

The catalog information 113 includes a user ID for identifying a user, an image ID for identifying image information of an image captured by the user, a product ID for identifying a product included in the image represented by the image information, and a product name, a price, a shop name, a stock, and a rating as examples of information on the product.

(Operation of Information Processing Apparatus)

Next, an explanation of an operation of the present exemplary embodiment will be divided and made as in (1) an operation on the side of the portable terminal 2, (2) an operation on the side of the information processing server 1, and (3) a shop determination operation.

(1) Operation on Side of Portable Terminal 2

Figure 7A:
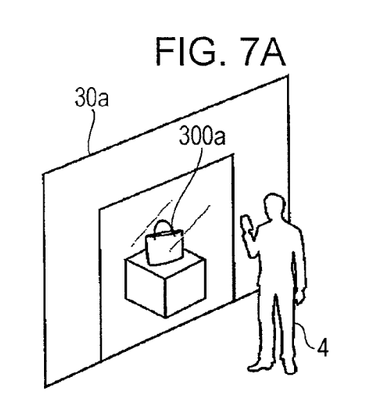
FIGS. 7A to 7D are schematic diagrams illustrating an example of an operation on the side of the portable terminal.
Figure 7B:
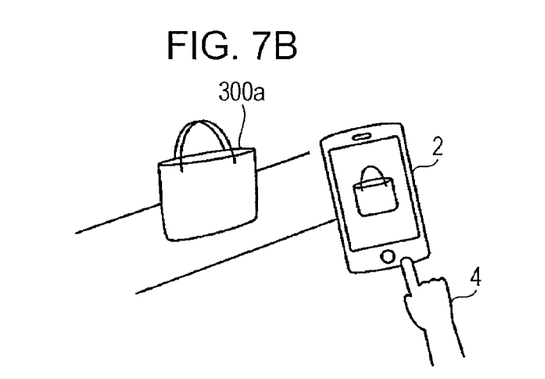
Figure 7C:
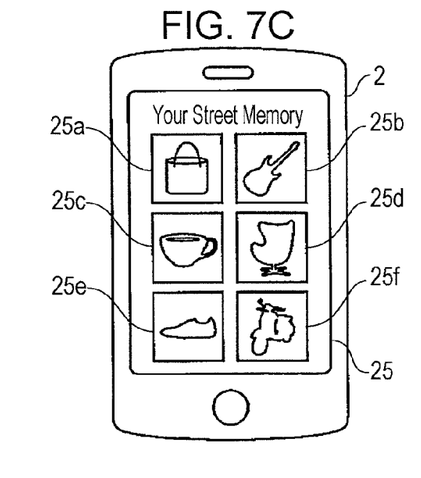

FIGS. 7A to 7C are schematic diagrams illustrating an example of an operation on the side of the portable terminal 2.

First, as illustrated in FIG. 7A, for example, suppose that a product 300a captures the interest of the user 4 at the shop 30a. Then, as illustrated in FIG. 7B, the user 4 captures an image of the product 300a using the portable terminal 2.

When a photo-shooting button is operated, the imaging portion 200 of the portable terminal 2 generates the image information 211, an image represented by the image information 211 including the product 300a. At the same time, the photo-shooting information acquisition portion 201 acquires the photo-shooting information 212 by acquiring location information using the GPS, acquiring a photo-shooting posture and a photo-shooting direction using the acceleration sensor, the electronic compass, and the like, and acquiring a focal length using the camera.

The communication portion 202 transmits the image information 211 of the image of the product, the image has been captured, and the photo-shooting information 212 (the location information, the photo-shooting direction, and the focal length) via the network 5 to the information processing server 1. Next, after a process explained in the following "(2) Operation on Side of Information Processing Server 1" is performed by the information processing server 1, the catalog information receiving portion 203 receives, as the catalog information 213, the catalog information 113 in which information on the product generated by the information processing server 1 is associated with image information, and the catalog display portion 204 performs display on the display 25 of the portable terminal 2 as illustrated in FIG. 7C.

As illustrated in FIG. 7C, as an example, images that the user has captured and that are represented by image information 25a to 25f are displayed on the display 25 of the portable terminal 2 in a list format.

Next, the user 4 views a catalog using the portable terminal 2, and performs an operation for selecting an image from among the images represented by the image information 25a to 25f if there is a product that captures the interest of the user 4.

Figure 7D:
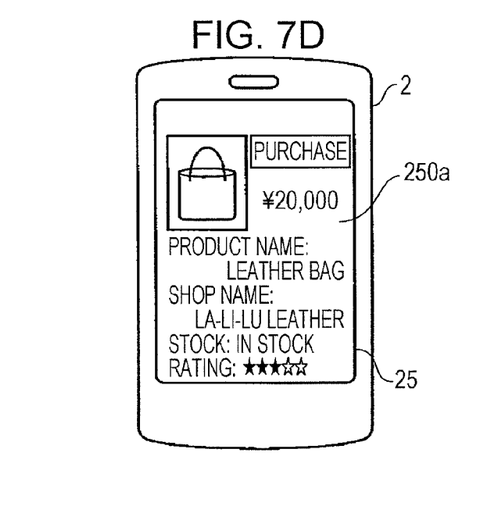

As illustrated in FIG. 7D, detailed information 250a on the product selected by the user 4 is displayed on the display 25 of the portable terminal 2. If necessary, the user 4 performs a purchase operation. The portable terminal 2 transmits a purchase request to the information processing server 1.

(2) Operation on Side of Information Processing Server 1

Figure 8:
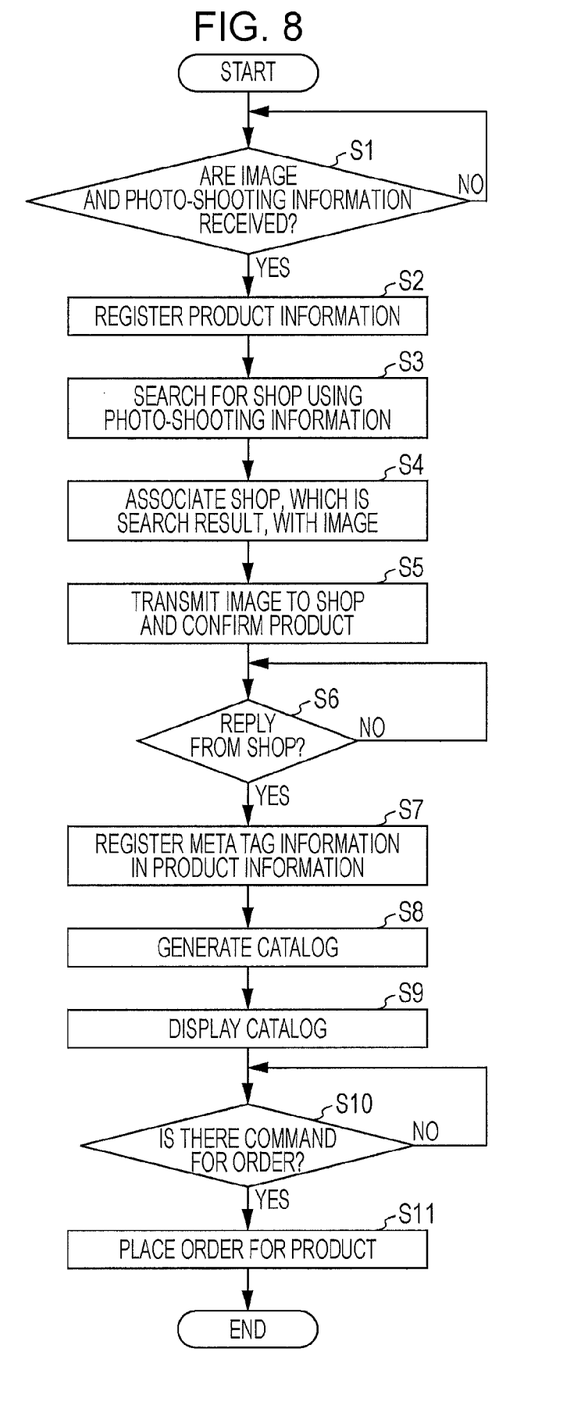
FIG. 8 is a flowchart illustrating an example of an operation of the information processing server.

FIG. 8 is a flowchart illustrating an example of an operation of the information processing server 1.

First, the image receiving portion 100 receives image information of an image captured by the portable terminal 2 and transmitted from the portable terminal 2 (S1).

In addition, the photo-shooting information receiving portion 101 receives photo-shooting information transmitted together with the image information from the portable terminal 2 (S1). Here, the photo-shooting information refers to the location information, which indicates the location of the portable terminal 2, the photo-shooting direction, and the focal length at the time when the image represented by the image information received by the image receiving portion 100 is captured.

The product management portion 103 performs registration in the product information 111 such that information on a product included in the image information is associated with the image information. Since the information on the product is unknown at the time when the image information is received by the image receiving portion 100, registration is performed such that the information on the product is left blank (S2). For example, although all items are registered in the example of FIG. 4, in the case where a user having a photographer ID of "005" captures an image represented by image information having an image ID of "00017", the product ID, the shop ID, and meta tag information are left blank at that point in time.

Next, the shop management portion 102 determines the location of the product in accordance with the photo-shooting information received by the photo-shooting information receiving portion 101, and determines a shop that handles the product, which is included in the image represented by the image information, by searching for the shop using the information registered in the shop information 112 (S3). Specifically, a location is determined which is located in the photo-shooting direction acquired by the acceleration sensor and the electronic compass and is the focal length away from the location indicated by the location information acquired from the GPS in the photo-shooting information, the focal length being acquired by the imaging unit 22. Then, a shop is determined the shop location of which illustrated in FIG. 5 is closest to the location, and the product is associated with the shop. Note that a determination method for the case where there are plural candidates for the shop will be described later in "(3) Shop Determination Operation".

The product management portion 103 registers the shop ID of the shop determined by the shop management portion 102 in the shop ID left blank in the product information 111 illustrated in FIG. 4 (S4).

Next, the product confirmation portion 104 transmits the image information to a terminal of the shop determined by the shop management portion 102 and requests confirmation of information on the product included in the image represented by the image information (S5). In the case where a reply is received from the shop (Yes in S6), the product confirmation portion 104 receives the information on the product transmitted from the shop and registers the information in the meta tag information in the product information 111 (S7). At the shop, a shop clerk or the like checks the image information that has reached the terminal, and returns information on the product included in the image represented by the image information to the information processing server 1. Note that the terminal in the shop may automatically determine the product and return information on the product.

Note that in the case where meta tag information is present that is the same as that of a product that has already been registered, that is, in the case where, for example, meta tag information is present that is the same as that of a product having a product ID of "001" corresponding to an image represented by image information having an image ID of "00104" and captured by a photographer having a photographer ID of "007" and an image represented by image information having an image ID of "00030" and captured by a photographer having a photographer ID of "013" illustrated in FIG. 4, the image information having an image ID of "00017" and representing an image captured by the photographer having a photographer ID of "005" is registered by treating the product corresponding to the image ID of "00017" and the product corresponding to the image IDs of "00104" and "00030" as the same products.

In addition, in the case where information on a product the same as the product included in the image represented by the image information has been registered in advance in the memory 11 or in the case where information may be acquired from a web site or the like in the Internet, the meta tag management portion 105 registers the information as meta tag information in the product information 111. Note that a search for the information may be made using a similar image or a product name, or using location information. The information may also be information on the shop. The reliability of meta tag information acquired by other portions may also be set to be lower than that of meta tag information that has been registered in the memory 11 in advance by the information processing server 1.

Next, for each user ID in accordance with the product information 111, the catalog generation portion 106 associates the image information with the information on the product and generates the catalog information 113 as illustrated in FIG. 6 (S8). The example of FIG. 6 illustrates the catalog information 113 corresponding to a user ID of "005".

Next, the catalog display portion 107 performs processing to display the catalog information 113 on the portable terminal 2 (S9). As illustrated in FIG. 7D, display is performed such that image information of an image captured by the portable terminal 2 is associated with information on a product included in the image information.

Next, as illustrated in FIG. 7D, in the case where a "purchase button" for placing an order for the product is operated at the portable terminal 2 (Yes in S10), the product order portion 108 performs a process for placing an order for the product with the shop that handles the product (S11).

(3) Shop Determination Operation

Figure 9A:
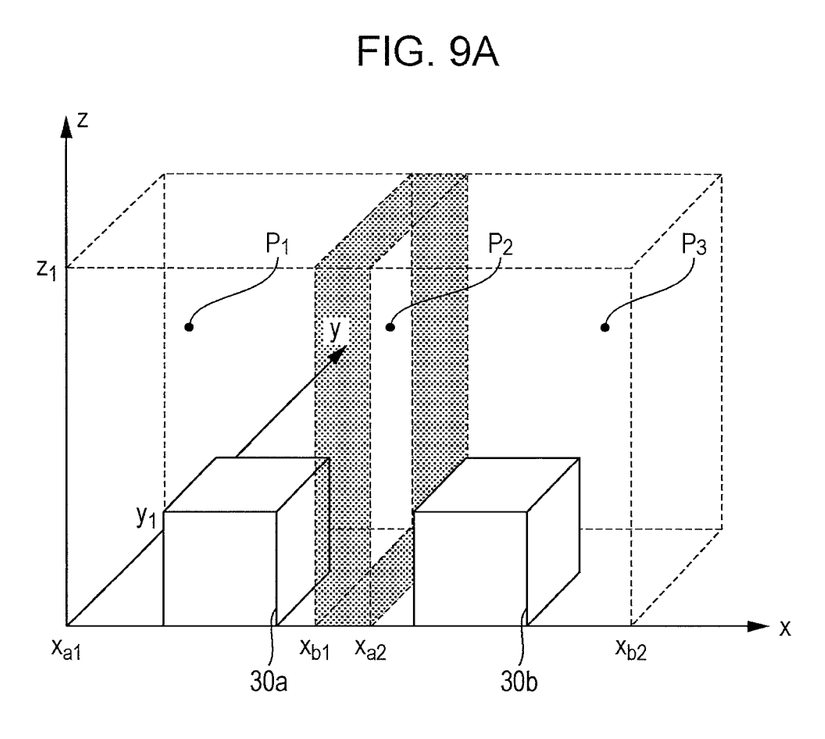
FIGS. 9A and 9B are schematic diagrams illustrating an example of an operation of a shop management portion.
Figure 9B:
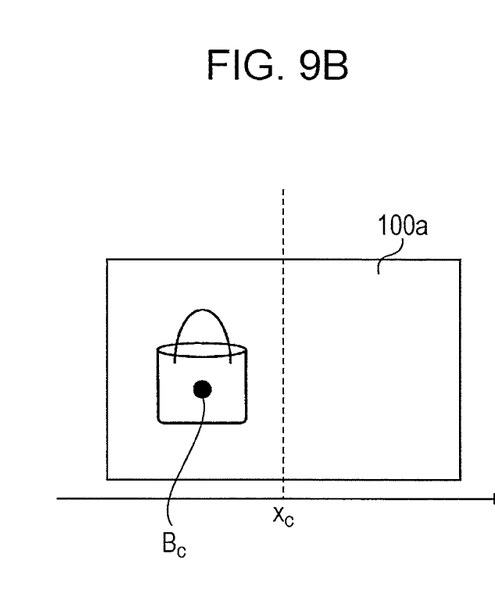

FIGS. 9A and 9B are schematic diagrams illustrating an example of an operation of the shop management portion 102.

Although the shop management portion 102 determines, in step S3 described above, a shop that handles the product, which is included in the image represented by the image information, by searching for the shop using the information registered in the shop information 112 in accordance with the photo-shooting information received by the photo-shooting information receiving portion 101, first, the shop management portion 102 determines whether or not location information of the photo-shooting information is included in a predetermined width from a shop location included in the shop information 112 illustrated in FIG. 5.

As illustrated in FIG. 9A, the predetermined width from a shop location included in the shop information 112 is, for example, a space having $x_{a1}<x<x_{a2}$, $0<y<y_1$, and $0<z<z_1$ for the shop 30a and a space having $x_{b1}<x<x_{b2}$, $0<y<y_1$, and $0<z<z_1$ for the shop 30b.

For example, in the case where the location information of the image information is $P_1$ ($x_{a1}<x<x_{b1}$), the shop management portion 102 determines that product information included in the image information is handled by the shop 30a. In the case where the location information of the image information is $P_3$ ($x_{a2}<x<x_{b2}$), the shop management portion 102 determines that product information included in the image information is handled by the shop 30b.

Here, for $P_2$ ($X_{b1}<x<x_{a2}$) that is an area where the spaces overlap, it is not possible to determine whether the area belongs to either the shop 30a or 30b. Thus, as illustrated in FIG. 9B, the shop management portion 102 calculates a luminance barycenter $B_c$ of an image represented by image information 100a, and determines whether the area belongs to either the shop 30a or 30b in accordance with whether the coordinates of the luminance barycenter $B_c$ are in a negative direction or in a positive direction from the center of the image represented by the image information in the x direction, which is $x=x_c$. In the example illustrated in FIGS. 9A and 9B, the shop management portion 102 determines that, in the case where the coordinates are in the negative direction, the product is handled by the shop 30a and that, in the case where the coordinates are in the positive direction, the product is handled by the shop 30b.

Other Exemplary Embodiments

Note that the present invention is not limited to the above-described exemplary embodiment, and various modifications may be made without departing from the scope of the present invention.

For example, the exemplary embodiment of the present invention may also be applied even to roadside stands as long as the locations of the roadside stands are registered. In addition, in the case of a roadside stand, an identification mark such as a barcode, a QR Code®, or the like is presented near the area where the roadside stand is located, information is registered in which the identification mark is associated with the location of the roadside stand, and a user may capture an image of a product and the identification mark at the same time. As a result, the exemplary embodiment of the present invention may also be applied even to portable terminals having no GPS, no acceleration sensor, no electronic compass, and the like.

Note that some or all of the functions of the information processing server 1 may be executed by the portable terminal 2, or some or all of the functions of the portable terminal 2 may be executed by the information processing server 1.

In addition, shops may not only be independent shops but also be a facility such as a shopping center having plural shops. In this case, a shop where an image of a product is captured is determined in the facility.

In the above-described exemplary embodiment, the functions of the portions 100 to 108 of the controller 10 are realized by a program; however, some or all of the portions may also be realized by a hardware device such as an ASIC or the like. In addition, the program used in the above-described exemplary embodiment may also be stored in a recording medium such as a CD-ROM or the like and provided. In addition, the order of the above-described steps explained in the above-described exemplary embodiment may be changed, some of the above-described steps may be removed, new steps may be added to the above-described steps, or the like without changing the spirit and scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a managing process, the managing process comprising:
   determining a location of a photo-shooting target based on photo-shooting information of image information, the image information being generated by capturing the photo-shooting target;
   associating at least one shop with the captured image, with reference to location information of a plurality of shops that has been registered in advance;
   confirming an item by transmitting the image information to the shop with which the captured image is associated, and by receiving information regarding the photo-shooting target from the shop; and
   generating catalog information by associating the received information regarding the photo-shooting target with the image information.

2. A non-transitory computer readable medium storing a program causing a computer to execute a managing process, the managing process comprising:
   determining a location of a photo-shooting target based on photo-shooting information of image information, the image information being generated by capturing the photo-shooting target;
   associating at least one shop with the captured image, with reference to location information of a plurality of shops that has been registered in advance; and
   determining the shop from a plurality of candidates based on a luminance barycenter of the image information.

3. The non-transitory computer readable medium according to claim 1, the managing process further comprising:
   determining the shop from a plurality of candidates based on a luminance barycenter of the image information.

4. The non-transitory computer readable medium according to claim 1, the managing process further comprising:
   in a case where the image information is selected from the catalog information, placing an order for the photo-shooting target with the shop associated with the selected image information.

5. A non-transitory computer readable medium storing a program causing a computer to execute a managing process, the managing process comprising:
   determining a location of a photo-shooting target based on photo-shooting information of image information, the image information being generated by capturing the photo-shooting target;
   associating at least one shop with the captured image, with reference to location information of a plurality of shops that has been registered in advance; and
   associating the shop with the captured image, the shop having location information which is within a predetermined width from the location of the photo-shooting target.

6. The non-transitory computer readable medium according to claim 1, the managing process further comprising:
   associating the shop with the captured image, the shop having location information which is within a predetermined width from the location of the photo-shooting target.

7. The non-transitory computer readable medium according to claim 2, the managing process further comprising:
   associating the shop with the captured image, the shop having location information which is within a predetermined width from the location of the photo-shooting target.

8. The non-transitory computer readable medium according to claim 3, the managing process further comprising:
   associating the shop with the captured image, the shop having location information which is within a predetermined width from the location of the photo-shooting target.

9. The non-transitory computer readable medium according to claim 4, the managing process further comprising:

associating the shop with the captured image, the shop having location information which is within a predetermined width from the location of the photo-shooting target.

10. An information processing apparatus comprising:

a management unit that:

determines a location of a photo-shooting target based on photo-shooting information of image information, the image information being generated by capturing the photo-shooting target;

associates at least one shop with the captured image, with reference to location information of a plurality of shops that has been registered in advance;

confirms an item by transmitting the image information to the shop with which the captured image is associated, and by receiving information regarding the photo-shooting target from the shop; and    generates catalog information by associating the received information regarding the photo-shooting target with the image information.

11. An information processing method comprising:

determining a location of a photo-shooting target based on photo-shooting information of image information, the image information being generated by capturing the photo-shooting target;

associating at least one shop with the captured image, with reference to location information of a plurality of shops that has been registered in advance;

confirming an item by transmitting the image information to the shop with which the captured image is associated, and by receiving information regarding the photo-shooting target from the shop; and generating catalog information by associating the received information regarding the photo-shooting target with the image information.

\* \* \* \* \*